Nov. 24, 1931. H. THÜRLINGS 1,833,727
MACHINE FOR KNEADING AND PULLING OUT DOUGH LIKE MASSES
Filed Oct. 17, 1930 3 Sheets-Sheet 3

Patented Nov. 24, 1931

1,833,727

UNITED STATES PATENT OFFICE

HERMANN THÜRLINGS, OF VIERSEN, GERMANY

MACHINE FOR KNEADING AND PULLING OUT DOUGH-LIKE MASSES

Application filed October 17, 1930, Serial No. 489,437, and in Germany January 29, 1930.

This invention has reference to the working, kneading and pulling out of tough or viscid dough-like or paste-like masses into skeins or strings of uniform thickness, and it refers in particular to means of applying such treatment to a pasty or doughy mass of sugar, obtained in various branches of manufacture of the sugar treating and manufacturing arts, and it is intended to overcome the various difficulties hitherto experienced in this particular art and to increase the uniformity of the product and to generally facilitate and improve the process of treatment. With these and other objects in view the container for the reception of the material that is to be submitted to the moulding operation is constituted by conical, centrally journaled driven rollers, arranged so as to form a kind of funnel and adapted to rotate on a common vertical axis, and cooperating with pulling out rollers or rolls for the treatment of the mass and disposed at the lower discharge opening of the container. By varying the driving speed of these pulling-out means the velocity of movement of the skein of material to be pulled out and in consequence thereof the rate and the quantity of the discharge may be adjusted. In accordance with a modified manner of treatment the sectional area of the delivery opening of the system of rollers may be enlarged or reduced, in order to be able to control the amount of the skein of sugar delivered from the roller arrangement. With this new machine the additional advantage is produced of enabling the operator to stop the operation of the pulling-out means without allowing the mass to be forced out between the rollers of the device. This object is accomplished by providing means of arresting the pulling out rollers behind the discharging extremity of the roller system, while the rollers themselves continue their movement. With a view of preventing escape of the mass of sugar or the like between the discharge end of the roller system and the pulling-out rollers the ends of the individual rollers of the system are provided with a conical intermediate or transition member according to this invention which seals the space between the discharge of the skein of material and the pulling-out rollers.

The invention will be more fully explained by reference to the accompanying drawings showing by way of exemplification an embodiment of a machine involving the principles of my invention.

Figure 1:
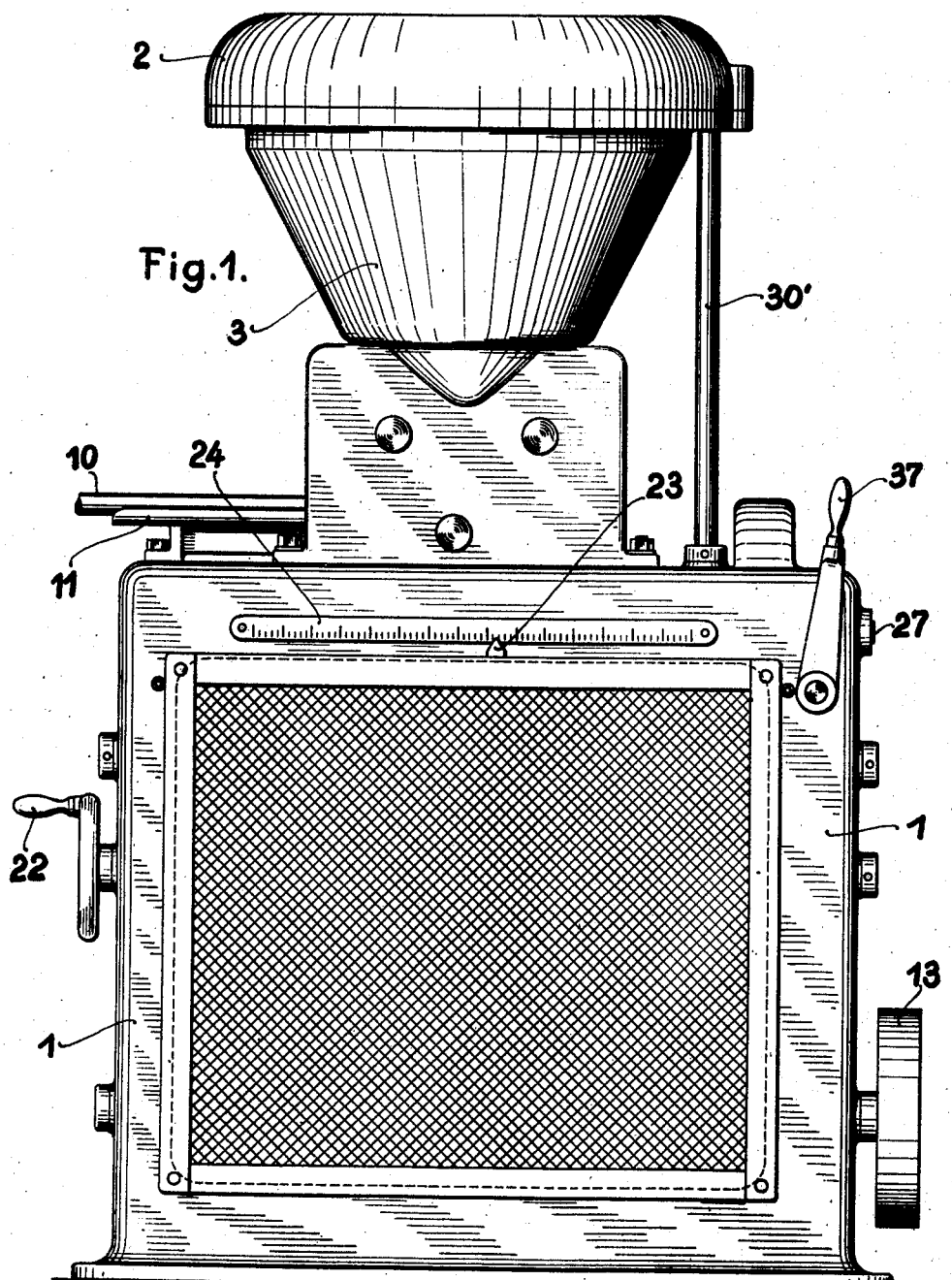
Figure 2:
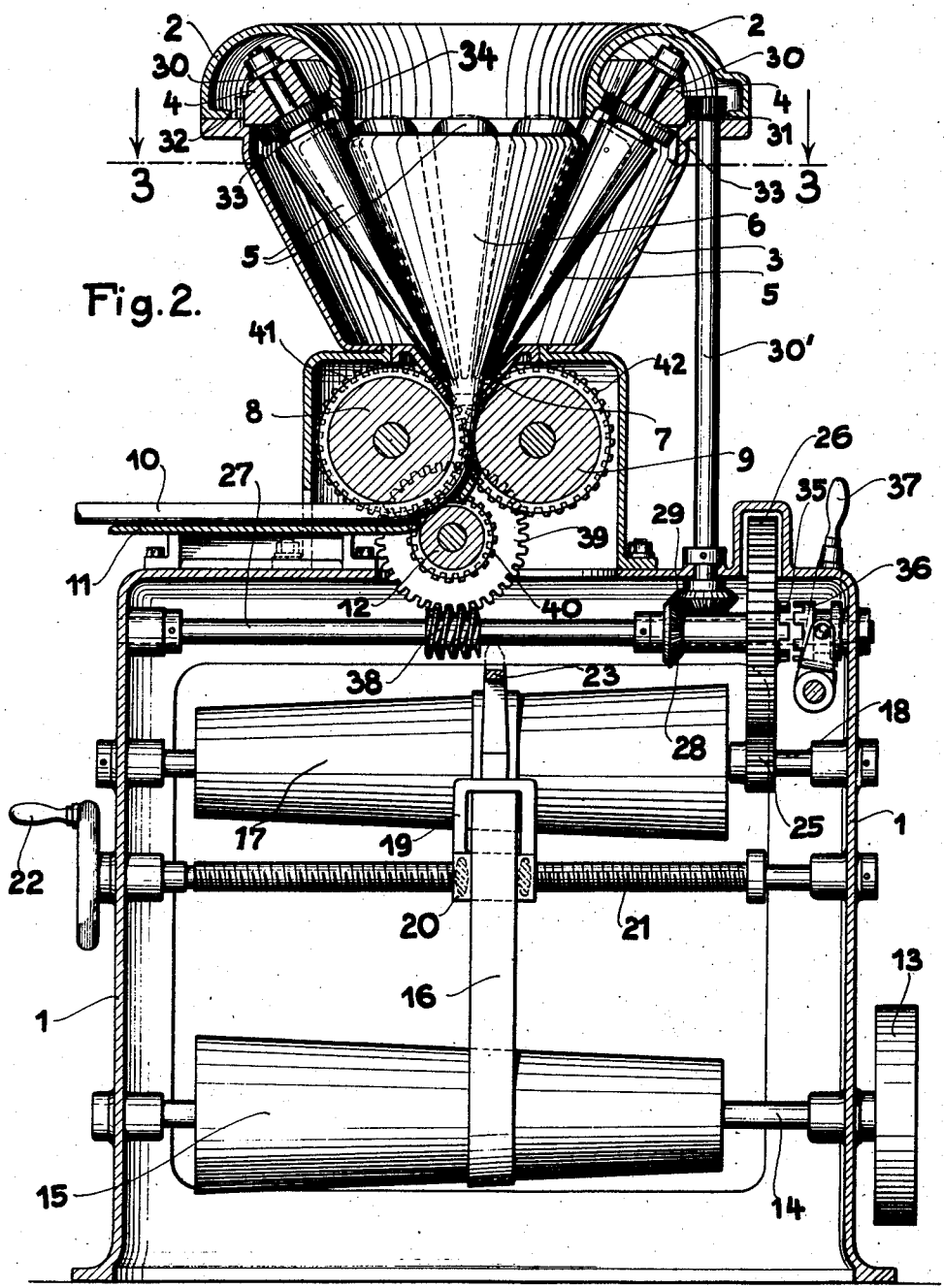
Figure 3:
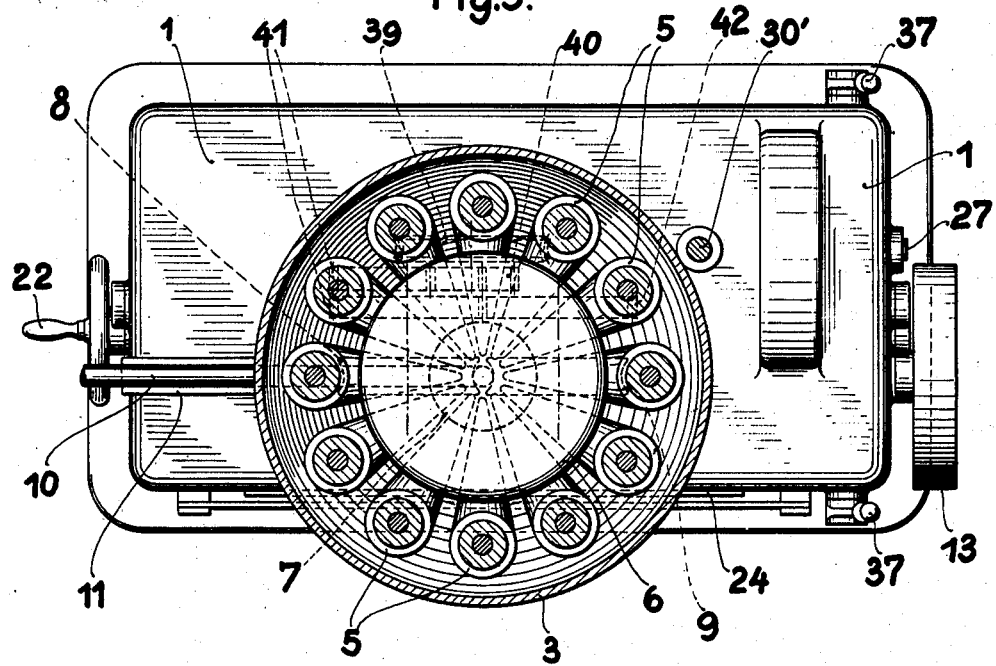

Figure 1 is an elevation of the machine; Figure 2 is a vertical longitudinal section thereof, and Figure 3 shows the machine in horizontal section.

The machine comprises a casing 1 in which the driving mechanism is contained. On the top of the casing a funnel 3 is mounted which is provided with a ring-shaped cover. In this ring-shaped cover 2 a ring 4 is rotatably mounted which is provided with inclined conical rollers 5 which are centrally mounted by means of studs 30 and which together form a downwardly open funnel-like container for the reception of the mass of material 6. The ring 4 with the rollers 5 may be rotated, while the rollers themselves are revolved on their axes, by which means the mass 6 is rolled into a conical lump of material. The ends of the rollers are inserted in a conical transition or intermediate member 7 and adjacent thereof two pulling-out rollers or rolls 8, 9 with arcuate peripheral grooves are arranged by means of which the skein of material is pulled out longitudinally and is moved forward in a curved open channel or gutter 11. An additional feeding roll or roller 12 may be provided intermediate the gutter and the other rollers.

The driving of the machine is effected by a pulley 13 mounted on a shaft 14 from which by means of a conical drum 15, belt 16 and conical drum 17 movement is transmitted to the shaft 18. The belt 16 may be shifted along the conical drums 15, 17 by means of a shipper form 19 carrying a collar 20 provided with interior threads and movable along the threaded spindle 21 by the operation of the crank 22, so as to be able to vary the driving speed of the shaft 18. The position of the shipper fork 19 is indicated by means of a pointer 23 which projects outwards and plays along a graduated scale 24. From the shaft 18 the movement is transmitted by means of a pinion 25 and a gear wheel 26 to a shaft 27, and by means of bevel-gear-wheels 28, 29 onto a shaft 30' which by means of a pinion 31 imparts movement to the ring 4 provided with a circular rack 32. By the rotation of said rack 32 the gear wheels 33 of the rollers 5 are revolved along a circular rack 34 of the cover 2, so as to thereby produce bodily rotation of the rollers 5. By the operation of a coupling device 35, 36 actuated by a hand lever 37 the driving movement of the shaft 30' is transmitted to a worm driving gear 38, 39 from which it is further transmitted to the rollers 8, 9, 12 by means of gear wheels 40, 41, 42.

The lump of material introduced into the roller system and indicated at 6 is rolled out by the rotation of the entire box formed by the rollers and of the rollers 5 themselves, so that an elongated conical body is obtained. By causing the conical rollers to revolve along the periphery of the mass 6 the carrying along of the mass in the direction of rotation of the roller box is avoided. The skein-like elongated body of material 10 which escapes at the bottom along the guide 11 is pulled out by the rollers 8, 9, 12 and is caused to pass into the gutter 11 from which it is fed to the point of further utilization. By varying the driving speed of the rollers 8, 9, 12 the velocity of the skein 10 may be adjusted. By interrupting the driving of the pulling-out rollers and thereby stopping the feeding and escape of the skein 10, the mass of sugar material or the like 6 is prevented from entering into the interstices between the rollers 5, inasmuch as the driving means for the entire roller-box continues to rotate. The transition member 7 prevents the escape of the mass 6 at the rollers 8 and 9.

The cross sectional size of the escaping skein-like piece of material 10 is so proportioned that a sufficient amount of sugar material or the like is always fed to the pulling-out rollers. The size of the escape opening may, if desired, be made adjustable, so that the thickness of the discharged skein or the like of material may be regulated.

It should be noted that any number of pulling-out rollers may be employed and other modifications and changes may be made in accordance with varying conditions of utilization of the invention, and without thereby deviating from the spirit and scope of the invention as defined in the appended claims.

I claim:—

1. In a machine of the kind described, a series of spaced conical rollers equidistant from a vertical axis and arranged with their axes in planes radiating from said axis, said rollers having their bases uppermost and having their axes converging from above downwardly, a funnel forming an inverted frusto-conical casing surrounding said rollers, a ring in said casing at the upper ends of said rollers, studs on said rollers mounted in said ring, and means to rotate the ring and rollers about said vertical axis.

2. In a machine of the kind described, a series of spaced conical rollers equidistant from a vertical axis and arranged with their axes in planes radiating from said axis, said rollers having their bases uppermost and having their axes converging from above downwardly, means to rotate said series of rollers on said vertical axis, and an inverted frusto-conical intermediate member in which the lower ends of said rollers rest.

3. In a machine of the kind described, a series of spaced conical rollers equidistant from a vertical axis and arranged with their axes in planes radiating from said axis, said rollers having their bases uppermost and having their axes converging from above downwardly, a funnel forming an inverted frusto-conical casing surrounding said rollers, a ring in said casing at the upper ends of said rollers, studs on said rollers mounted in said ring, means to rotate the ring and rollers about said vertical axis, and an inverted frusto-conical intermediate member in which the lower ends of said rollers rest.

4. In a machine of the kind described, a series of spaced conical rollers equidistant from a vertical axis and arranged with their axes in planes radiating from said axis, said rollers having their bases uppermost and having their axes converging from above downwardly, a funnel forming an inverted frusto-conical casing surrounding said rollers, a ring in said casing at the upper ends of said rollers, studs on said rollers mounted in said ring, means to rotate the ring and rollers about said vertical axis, an inverted frusto-conical intermediate member in which the lower ends of said rollers rest, a pair of spaced horizontal pulling out rollers below the lower ends of the conical rollers, and means to drive said pulling out rollers.

5. In a machine of the kind described, a series of spaced conical rollers equidistant from a vertical axis and arranged with their axes in planes radiating from said axis, said rollers having their bases uppermost and having their axes converging from above downwardly, a funnel forming an inverted frusto-conical casing surrounding said rollers, a ring in said casing at the upper ends of said rollers, studs on said rollers mounted in said ring, means to rotate the ring and rollers about said vertical axis, an inverted frusto-conical intermediate member in which the lower ends of said rollers rest, a pair of spaced horizontal pulling out rollers below the lower ends of the conical rollers, a third pulling out roller below said pair of rollers and spaced from one thereof, and a channel member extending from the space between the third pulling out roller and the adjacent roller of said pair, and means to drive said pulling out rollers.

In testimony whereof I affix my signature.

HERMANN THÜRLINGS.